United States Patent
Black et al.

(10) Patent No.: US 10,831,560 B2
(45) Date of Patent: Nov. 10, 2020

(54) WORKLOAD PERFORMANCE IMPROVEMENT USING DATA LOCALITY AND WORKLOAD PLACEMENT

(71) Applicant: International Business Machines Corporation, Armonk, NY (US)

(72) Inventors: Samuel M. Black, Aurora (CA); Michael Spriggs, Ontario (CA); John Lewars, New Paltz, NY (US); Lior Aronovich, Thornhill (CA)

(73) Assignee: International Business Machines Corporation, Armonk, NY (US)

( * ) Notice: Subject to any disclaimer, the term of this patent is extended or adjusted under 35 U.S.C. 154(b) by 137 days.

(21) Appl. No.: 16/112,479

(22) Filed: Aug. 24, 2018

(65) Prior Publication Data
US 2020/0065158 A1    Feb. 27, 2020

(51) Int. Cl.
*G06F 9/50*    (2006.01)
*G06F 11/30*    (2006.01)
*G06F 11/34*    (2006.01)

(52) U.S. Cl.
CPC ........ *G06F 9/5083* (2013.01); *G06F 11/3024* (2013.01); *G06F 11/3414* (2013.01)

(58) Field of Classification Search
CPC .............................. G06F 3/067; G06F 3/0635
See application file for complete search history.

(56) References Cited

U.S. PATENT DOCUMENTS

| | | | |
|---|---|---|---|
| 8,095,764 B1* | 1/2012 | Bauer ................... | G06F 3/0605 |
| | | | 711/162 |
| 9,021,490 B2 | 4/2015 | Marchand | |
| 9,442,770 B1 | 9/2016 | Cudak et al. | |
| 9,846,600 B1 | 12/2017 | Williams et al. | |
| 9,852,009 B2 | 12/2017 | Chen et al. | |
| 2010/0020718 A1* | 1/2010 | Tabbara ................. | G06Q 30/06 |
| | | | 370/254 |

(Continued)

OTHER PUBLICATIONS

Y. Chen et al., "Interactive Analytical Processing in Big Data Systems: A Cross-Industry Study of MapReduce Workloads", Proceedings of the VLDB Endowment, vol. 5, No. 12, Aug. 27-31, 2012, pp. 1802-1813.

(Continued)

*Primary Examiner* — Dong U Kim
(74) *Attorney, Agent, or Firm* — Kunzler Bean & Adamson

(57) ABSTRACT

A system for improving workload performance using data locality and workload placement may include a schedule module that schedules workloads for execution on a computing device in one or more computing devices. Also, the computing devices access a shared data storage. Further, the system may include a tracking module that maintains a data store that associates paths in the shared data storage with dispatched workloads and associates the paths with at least one computing device, wherein a dispatched workload and the at least one computing device accessed a path; and a preferred device identification module that identifies preferred computing devices in the one or more computing devices for executing undispatched workloads based on information in the data store, wherein the schedule module schedules the execution of the undispatched workloads in response to the identified preferred computing devices.

20 Claims, 7 Drawing Sheets

(56) References Cited

U.S. PATENT DOCUMENTS

| | | | |
|---|---|---|---|
| 2013/0346532 A1* | 12/2013 | D'Amato | G06F 3/0617 709/213 |
| 2016/0328273 A1 | 11/2016 | Molka et al. | |
| 2017/0052707 A1 | 2/2017 | Koppolu et al. | |
| 2017/0132043 A1 | 5/2017 | Farhan et al. | |
| 2017/0188059 A1* | 6/2017 | Major | H04N 21/2402 |
| 2017/0346690 A1 | 11/2017 | Dorado et al. | |

OTHER PUBLICATIONS

B. Hindman et al., "Mesos: A Platform for Fine-Grained Resource Sharing in the Data Center", NSDI'11 Proceedings of the 8th USENIX conference, Mar. 30-Apr. 1, 2011, pp. 1-14.

V. Kulba et al., "Problem of optimal placement of data files in large-scale unreliable distributed systems", 2017 Tenth International Conference Management of Large-Scale System Development (MLSD), Oct. 2-4, 2017, pp. 1-5.

* cited by examiner

WORKLOAD PERFORMANCE IMPROVEMENT USING DATA LOCALITY AND WORKLOAD PLACEMENT

FIELD

This invention relates to workload management and more particularly relates to methods and systems for workload performance improvements using data locality and workload placement.

BACKGROUND

Computing devices execute one or more tasks as workloads. Frequently, when executing a workload, a computing device may execute many tasks and may access large data files. For example, in executing a workload, a computing device may execute tasks related to chip design, deep learning, genomics, among other large computational tasks. Also, to perform tasks, the computing device may access large data files. In some embodiments, a computing device may execute different tasks that access the same large data files. Accordingly, a filesystem supporting the computing device, may repeatedly provide the same large data files when a computing device executes multiple tasks.

SUMMARY

Methods and systems for workload performance improvement using data locality and workload placement are provided. A system for improving workload performance using data locality and workload placement may include a schedule module that schedules one or more workloads for execution on a computing device in one or more computing devices. Also, the one or more computing devices access a shared data storage. Further, the system may include a tracking module that maintains a data store that associates one or more paths in the shared data storage with one or more dispatched workloads in the one or more workloads and associates the one or more paths with at least one computing device in the one or more computing devices, wherein a dispatched workload in the one or more dispatched workloads and the at least one computing device accessed a path in the one or more paths; and a preferred device identification module that identifies one or more preferred computing devices in the one or more computing devices for executing undispatched workloads based on information in the data store, wherein the schedule module schedules the execution of the undispatched workloads in response to the identified one or more preferred computing devices.

In some embodiments, the data store may include path information that describes the one or more paths, wherein the path information for a path in the one or more paths includes at least one of a path identifier; a size of data stored in association with the path; workload identifiers that identify the one or more dispatched workloads that have accessed the path; the at least one computing device that processed the one or more dispatched workloads that have accessed the path; one or more processing times when the at least one computing device has processed the one or more dispatched workloads that have accessed the path; and a frequency of how often the at least one computing device has processed the one or more dispatched workloads that have accessed the path.

In further embodiments, the tracking module comprises an update module that updates path information in the data store in response to an undispatched workload being dispatched to the one or more computing devices. Also, the update module may update the path information by performing at least one of: examining dispatched workload information of the one or more dispatched workloads; retrieving the one or more paths that are used by the one or more dispatched workloads; retrieving a size of data stored under each path in the one or more paths; and retrieving computing device information for the one or more computing devices that execute the one or more dispatched workloads.

In additional embodiments, the preferred device identification module may include a filtering module that performs at least one of filtering small paths in the one or more paths, wherein the data stored under the small paths is smaller than a size threshold; filtering aged paths in the one or more paths, wherein the aged paths have access times older than a time threshold; and filtering infrequent paths in the one or more paths, wherein the infrequent paths have access frequencies smaller than a frequency threshold. Also, the preferred device identification module comprises a preferred device update module configured to update the one or more preferred computing devices for the undispatched workloads. In certain embodiments, the preferred device update module updates the one or more preferred computing devices by performing at least one of: examining the one or more paths in the shared data storage that are to be accessed by the undispatched workloads; identifying stored paths in the one or more paths, wherein a stored path is identified in the data store; compiling a list of computing devices for identified undispatched workloads based on entries of the stored paths in the data store that match the one or more paths in the shared data storage that are to be accessed by the undispatched workloads; assigning a preference to the one or more computing devices identified in the list of computing devices; and providing the list of computing devices as the one or more preferred computing devices for a respective undispatched workload.

In further embodiments, the preference of the one or more computing devices identified in the list of computing devices is based on at least one of a number of paths that a prospective computing device in the one or more computing devices has accessed that are to be used by the respective undispatched workload; a size of data for the paths the prospective computing device has accessed that are to be used by the respective undispatched workload; and a frequency of access for the paths that the prospective computing device has accessed that are to be used by the respective undispatched workload. Additionally, scheduling the undispatched workloads by the schedule module includes preferring to schedule computing devices identified in the one or more preferred computing devices for the execution of the respective undispatched workload; and scheduling the computing devices for the respective undispatched workload based on the preference assigned to the one or more computing devices identified in the list of computing devices for execution of the respective undispatched workload.

In certain embodiments, a method for improving workload performance using data locality and workload placement may include scheduling one or more workloads for execution on a computing device in one or more computing devices, wherein the one or more computing devices access a shared data storage; maintaining a data store that associates one or more paths in the shared data storage with one or more dispatched workloads in the one or more workloads and associates the one or more paths with at least one computing device in the one or more computing devices, wherein a dispatched workload in the one or more dispatched workloads and the at least one computing device accessed a path in the one or more paths; identifying one or more preferred computing devices in the one or more computing devices for executing undispatched workloads based on information in the data store; and scheduling the execution of the undispatched workloads in response to the identified one or more preferred computing devices.

In further embodiments, the data store may include path information that describes the path, wherein the path information comprises at least one of: a path identifier; a size of data stored in association with the path; workload identifiers that identify the one or more dispatched workloads that have accessed the path; the at least one computing device that processed the one or more dispatched workloads that have accessed the path; one or more processing times when the at least one computing device has processed the one or more dispatched workloads that have accessed the path; and a frequency of how often the at least one computing device has processed the one or more dispatched workloads that have accessed the path.

In some embodiments, the method may further include updating path information in the data store in response to an undispatched workload being dispatched to the one or more computing devices. Also, updating the path information may include at least one of examining dispatched workload information of the one or more dispatched workloads; retrieving the one or more p22'aths that are used by the one or more dispatched workloads; retrieving a size of data stored under each path in the one or more paths; and retrieving computing device information for the one or more computing devices that execute the one or more dispatched workloads. Additionally, the method may include at least one of filtering small paths in the one or more paths, wherein the data stored under the small paths is smaller than a size threshold; filtering aged paths in the one or more paths, wherein the aged paths have access times older than a time threshold; and filtering infrequent paths in the one or more paths, wherein the infrequent paths have access frequencies smaller than a frequency threshold.

In additional embodiments, the method may further include updating the one or more preferred computing devices for the undispatched workloads. Also, the method may include updating the one or more preferred computing devices by performing at least one of examining the one or more paths in the shared data storage that are to be accessed by the undispatched workloads; identifying stored paths in the one or more paths, wherein a stored path is identified in the data store; compiling a list of computing devices for identified undispatched workloads based on entries of the stored paths in the data store that match the one or more paths in the shared data storage that are to be accessed by the undispatched workloads; assigning a preference to the one or more computing devices identified in the list of computing devices; and providing the list of computing devices as the one or more preferred computing devices for a respective undispatched workload.

In certain embodiments, the preference of the one or more computing devices identified in the list of computing devices is based on at least one of a number of paths that a prospective computing device in the one or more computing devices has accessed that are to be used by the respective undispatched workload; a size of data for the paths the prospective computing device has accessed that are to be used by the respective undispatched workload; and a frequency of access for the paths that the prospective computing device has accessed that are to be used by the respective undispatched workload. Further, scheduling the undispatched workloads may include preferring to schedule computing devices identified in the one or more preferred computing devices for the execution of the respective undispatched workload; and scheduling the computing devices for the respective undispatched workload based on the preference assigned to the one or more computing devices identified in the list of computing devices for execution of the respective undispatched workload.

Also disclosed are computer program products that include a computer-readable storage medium including program instructions embodied therewith for improving workload performance using data locality and workload placement. Some program instructions executable by a processor may cause the processor to schedule one or more workloads for execution on a computing device in one or more computing devices, wherein the one or more computing devices access a shared data storage; maintain a data store that associates one or more paths in the shared data storage with one or more dispatched workloads in the one or more workloads and associates the one or more paths with at least one computing device in the one or more computing devices, wherein a dispatched workload in the one or more dispatched workloads and the at least one computing device accessed a path in the one or more paths; identify one or more preferred computing devices in the one or more computing devices for executing undispatched workloads based on information in the data store; and schedule the execution of the undispatched workloads in response to the identified one or more preferred computing devices.

Additionally, the data store may store path information that describes the path, wherein the path information comprises at least one of a path identifier; a size of data stored in association with the path; workload identifiers that identify the one or more dispatched workloads that have accessed the path; the at least one computing device that processed the one or more dispatched workloads that have accessed the path; one or more processing times when the at least one computing device has processed the one or more dispatched workloads that have accessed the path; and a frequency of how often the at least one computing device has processed the one or more dispatched workloads that have accessed the path.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
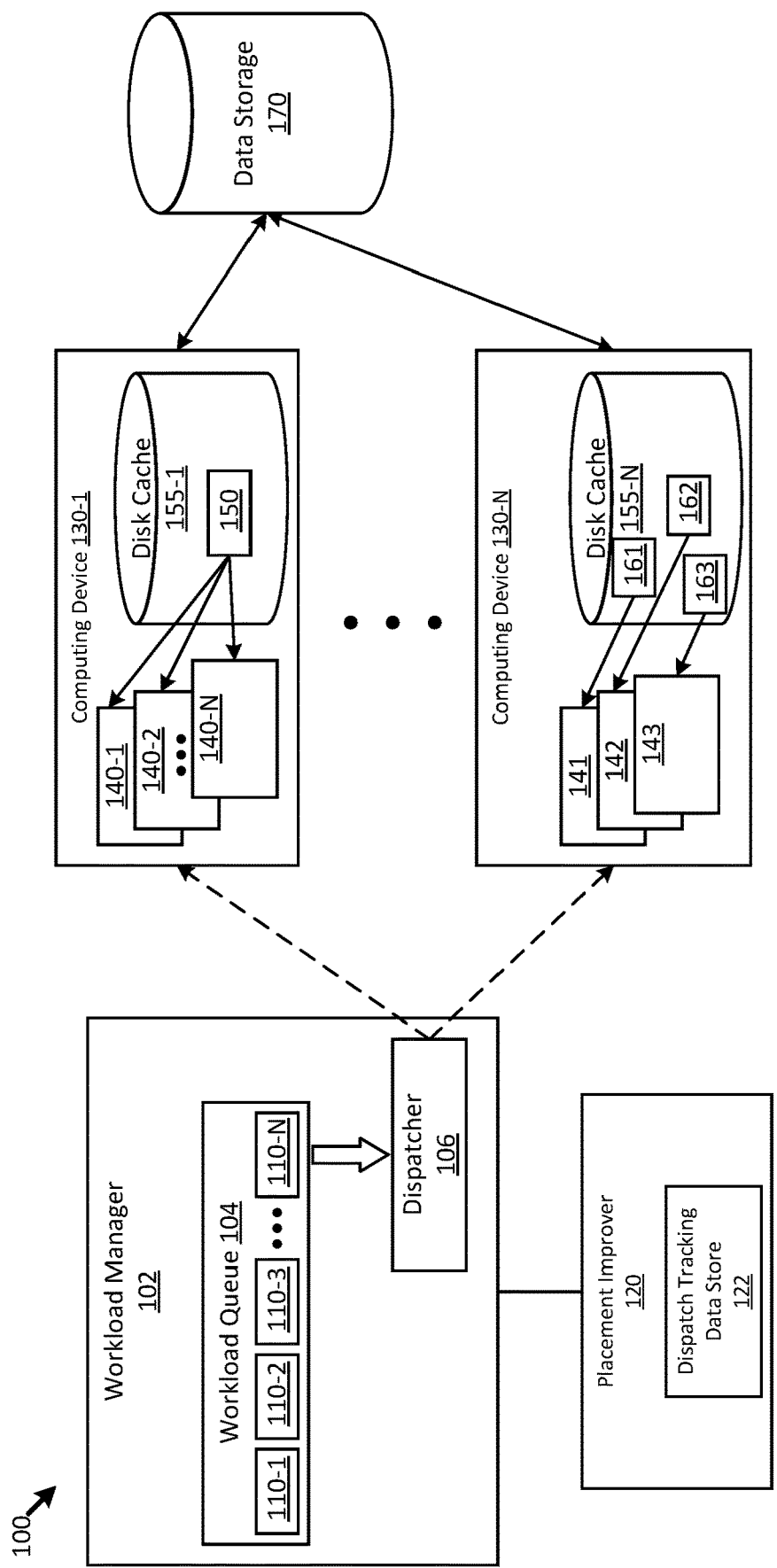
FIG. 1 is a block diagram of one embodiment of a computing system for improving workload performance using data locality and workload placement.

Disclosed herein are various embodiments providing methods, systems, and computer program products that can select locations on a storage device based on characterizations of adjacent location errors. Notably, the language used in the present disclosure has been principally selected for readability and instructional purposes, and not to limit the scope of the subject matter disclosed herein in any manner.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several storage devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The description of elements in each figure below may refer to elements of proceeding figures. For instance, like numbers can refer to similar elements in all figures, including alternate embodiments of similar elements.

With reference now to the figures, FIG. 1 is a block diagram of one embodiment of a computing system 100 for improving workflow performance using data locality and workload placement. In certain embodiments, the computing system 100 may include multiple computing devices 130-1-130-N (cumulatively referred to herein as computing devices 130). For example, a computing device 130, as used herein, may be a device capable of performing tasks in response to the execution of computer readable instructions. In certain embodiments, the computing system 100 may have multiple computing devices 130 that share data as part of a distributed file system. For instance, the computing devices 130 may acquire data from a shared data storage 170. When a computing device 130 acquires data from the shared data storage 170, a processor on the computing device 130 may perform tasks as instructed by the acquired data or the computing device 130 may process the data acquired from the data storage 170.

In certain embodiments, the data storage 170 may be any suitable type of storage device or cluster of storage devices that are known or developed in the future that can store computer-usable data. In various embodiments, the data storage 170 may include one or more non-transitory computer-usable mediums (e.g., readable, writable, etc.), which may include any non-transitory apparatus or device that can contain, store, communicate, propagate, and/or transport instructions, data, computer programs, software, code, routines, etc., for processing by or in connection with the computing system 100.

In certain embodiments, the data storage 170 may be implemented as a direct-access storage devices (DASD). The data storage 170, in further embodiments, may include non-transitory memory such as, for example, flash memory (e.g., a solid-state device (SSD) or other non-volatile storage devices that store persistent data), a dynamic random access memory (DRAM) device, an enhanced dynamic random access memory (EDRAM) device, a static random access memory (SRAM) device, a hard disk drive (HDD), a near-line drive, tape drive (e.g., magnetic and/or virtual), and/or other type(s) (e.g., non-volatile and/or persistent) of memory devices, etc. that are possible and contemplated herein. In some embodiments, the data storage 170 may be a cluster of separate storage devices that are configured to store data. For example, the data storage 170 may be a network file system, a parallel file system, or other type of file system where multiple computing devices access the data storage 170.

In various embodiments, the data storage 170 may include non-volatile/persistent hardware and/or software configured to perform long-term data storage operations, including, but not limited to, data archiving, data backup, data mirroring, replicating data, etc. For instance, the data storage 170 may include non-volatile and/or persistent hardware and/or software to perform long-term data storage operations, which may include write operations, read operations, read-write operations, etc., among other operations.

Additionally, each of the computational devices 130-1-130-N may include an associated local disk cache 155-1-155-N (collectively referred to herein as local disk caches 155). As used herein, a local disk cache 155 may refer to data storage device that is locally situated on an associated computing device 130. Like the data storage 170, local disk caches 155 may be any suitable type of storage device or cluster of storage devices that are known or developed in the future that can store computer-usable data. In various embodiments, the local disk caches 155 may include one or more non-transitory computer-usable mediums (e.g., readable, writable, etc.), which may include any non-transitory apparatus or device that can contain, store, communicate, propagate, and/or transport instructions, data, computer programs, software, code, routines, etc., for processing by or in connection with the computing system 100.

In certain embodiments, the local disk caches 155 may be implemented as direct-access storage devices (DASD). The local disk caches 155, in further embodiments, may include non-transitory memory such as, for example, flash memory (e.g., a solid-state device (SSD) or other non-volatile storage devices that store persistent data), a dynamic random access memory (DRAM) device, an enhanced dynamic random access memory (EDRAM) device, a static random access memory (SRAM) device, a hard disk drive (HDD), a near-line drive, tape drive (e.g., magnetic and/or virtual), and/or other type(s) (e.g., non-volatile and/or persistent) of memory devices, etc. that are possible and contemplated herein. In some embodiments, the local disk caches 155 may be a cluster of separate storage devices that are configured to store data. Alternatively, the local disk caches 155 may be partitions on storage devices that are located on the computing devices 130.

In certain embodiments, the computing devices 130 may acquire data for storage within the local disk caches 155 from the data storage 170. When data from the data storage 170 is stored on the local disk cache 155, the computing device 130 associated with the local disk cache 155 may more efficiently use the data for the execution of one or more workloads. As used herein, a workload may be one or more tasks that are performed by a computing device 130 to accomplish a particular task. As illustrated, the computing device 130-1 may be assigned to execute workloads 140-1-140-N. Also, the computing device 130-N may be assigned to execute workloads 141, 142, and 143. The computing devices 130 may use data stored on the shared data storage 170 to execute the workloads assigned thereto.

In some embodiments, to facilitate the execution of the workloads, the data associated with the workloads may be stored within a local disk cache 155. For example, where computing device 130-N executes the workloads 141, 142, and 143, cached data 161, 162, and 163, respectively associated with the workloads 141, 142, and 143, may be stored in the local disk cache 155-N. Accordingly, when the computing device 130-N executes the workloads 141, 142, and 143, the cached data 161, 162, and 163 may be readily available for the computing device 130-N to execute the workloads 141, 142, and 143.

However, in certain embodiments, a local disk cache 155 may become overloaded. As used herein, a local disk cache 155 becomes overloaded when the local disk cache 155 is unable to hold the data used for the execution of the workloads assigned to a particular computing device 130. For example, the computing device 130-N may be assigned to execute three separate workloads 141, 142, and 143. To facilitate the execution of the workloads 141, 142, and 143, the computing device 130-N may attempt to store data 161, 162, and 163 within the local disk cache 155-N. Yet, the local disk cache 155-N may not be sufficiently large to simultaneously hold the data 161, 162, and 163. Accordingly, the computing device 130-N may initially execute the workload 141 using the data 161, acquired from the data storage 170. Subsequently, the computing device 130-N may be assigned to execute workload 142, which execution uses the data 162 to successfully execute workload 142. As the data 162 is not stored in the local disk cache 155-N, the computing device 130-N may acquire the data 162 from the data storage 170. As the computing device 130-N retrieves the data 162 from the data storage 170, the execution of the workload 142 may take longer than desired due to the retrieval of data from the data storage 170 as compared to using data that has been previously stored in the local disk cache 155-N. Similarly, the execution of the workload 143 may be subject to similar issues as the execution of the workload 142 as the data 163 would be retrieved from the data storage 170 to support the execution of the workload 143. Further, the local disk cache 155-N may not be large enough to store all of the data 161, 162, and 163. Accordingly, when the data 163 is loaded into the local disk cache 155-N, the data 161 may be deleted from the local disk cache 155-N to provide more storage space for the data 163. Thus, if the computing device 130-N is assigned to execute the workload 141 again, the computing device 130-N may again load the data 161 from the data storage 170 to support the execution of the workload 141.

Conversely, in certain embodiments, different workloads may execute on a computing device 130, where the different workloads use the same data that is stored in the associated local disk cache 155. For example, computing device 130-1 may be assigned to execute workloads 140-1-140-N. As illustrated, the execution of the separate workloads 140-1-140-N may use the same data 150. For instance, the computing device 130-1 may be assigned to execute the workload 140-1. To execute the workload 140-1, the computing device 130-1 may acquire data 150 from the data storage 170. The computing device 130-1 may store the data 150 in the local disk cache 155-1 such that the data 150 is available to support the execution of the workload 140-1. Subsequently, the computing device 130-1 may be assigned to execute the workload 140-2. To execute the workload 140-2, the computing device 130-1 may use data 150. In contrast to the execution of the workloads 141, 142, and 143, the data 150, used to support the execution of the workload 140-2, may already be stored in the local disk cache 155-1. Thus, the execution of the workload 140-2 may be accomplished more expeditiously due to the data 150 already existing in the local disk cache 155-1. As such, the computing device 130-1 may execute the workload 140-2 without having to acquire further data from the data storage 170. Accordingly, as the data 150 is already stored in the local disk cache 155-1 due to the execution of the workload 140-1, the computing device 130-1 may more rapidly execute the workloads 140-2-140-N because the computing device 130-1 can execute the workloads 140-2-140-N using the data 150 stored in the local disk cache 155-1.

In some embodiments, the computing system 100 may include a workload manager 102. As used herein, a workload manager 102 may determine which computing device 130 executes a workload and dispatches a particular workload to a computing device 130 for execution. In certain embodiments, the workload manager 102 may determine which computing device 130 is to execute a dispatched workload based on the data stored in a local disk cache 155 of a particular computing device 130.

In further embodiments, the workload manager 102 may include a workload queue 104 and a dispatcher 106. As used herein, a workload queue 104 may be a repository identifying a series of undispatched workloads 110-1-110-N (collectively referred to herein as undispatched workloads 110). The workload queue 104 may also be a data structure that organizes identifiers of undispatched workloads 110 such that a workload in the undispatched workloads 110 may be identified for dispatching to a computing device 130. Also, the dispatcher 106 may determine to which computing device 130 an undispatched workload 110 is to be dispatched and dispatches undispatched workloads 110 to the designated computing device 130. For example, when an undispatched workload 110 in the workload queue 104 is to be dispatched to a computing device 130, the dispatcher 106 may acquire the undispatched workload 110 from the workload queue 104 and determine which computing device 130 to send the undispatched workload 110 to for execution. Upon determining which computing device 130 should receive the undispatched workload 110, the dispatcher 106 sends the undispatched workload 110 to the determined computing device 130 for execution.

In certain embodiments, the computing system 100 may include a placement improver 120. As used herein, the placement improver 120 may communicate with the workload manager 102. Further, the placement improver 120 may provide identifications of preferred computing devices for a particular undispatched workload 110 to the workload manager 102. When the workload manager 102 receives the identifications of preferred computing devices for a particular undispatched workload 110, the workload manager 102 may append the identifications of preferred computing devices to the undispatched workload 110 in the workload queue 104. Accordingly, when the dispatcher 106 receives an undispatched workload 110, the dispatcher 106 may select a computing device 130 identified as a preferred computing device that is associated with the undispatched workload 110 under consideration by the dispatcher 106. Alternatively, the placement improver 120 may provide the preferred computing devices to the dispatcher 106. For example, the placement improver 120 may indicate preferred computing devices for an undispatched workload 110 along with an identifier of the associated undispatched workload 110 to the dispatcher 106. Accordingly, when the dispatcher 106 dispatches an undispatched workload 110 having an identifier associated with the list of preferred computing devices, the dispatcher 106 may select a computing device 130 identified on the list of preferred computing devices.

In further embodiments, to provide the identifications of preferred computing devices, the placement improver 120 may include a dispatch tracking data store 122. As used herein, a dispatch tracking data store 122 may be a data store for data communicated from the workload manager 102 to the placement improver 120 that stores information regarding computing devices 130 and workloads that have been dispatched to the computing devices 130. Further, the dispatch tracking data store 122 may store information regarding the data stored in a local disk cache 155 for particular computing devices 130. From the information stored in the dispatch tracking data store 122, the placement improver 120 may create a list of preferred computing devices, where a computing device 130 on the list of preferred computing devices may represent a computing device 130 having data stored in the associated local disk cache 155 that may be used by the undispatched workload 110 associated with the list of preferred computing devices. The placement improver 120 may provide identifications for the computing devices 130 identified on the list of preferred computing devices to the workload manager 102. The workload manager 102 may then attach the identifications for the preferred computing devices to an associated undispatched workload 104. As such, when the dispatcher 106 dispatches the undispatched workload 110 associated with a list of preferred computing devices to a computing device 130 identified on the list of preferred computing devices, the dispatcher 106 may attempt to dispatch workloads to computing devices having data stored in a local disk cache 155 that will be used in the execution of workload. Accordingly, as the computing devices 130 may already have the data stored in the associated local disk cache 155, the execution time for the workloads may be reduced.

Figure 2:
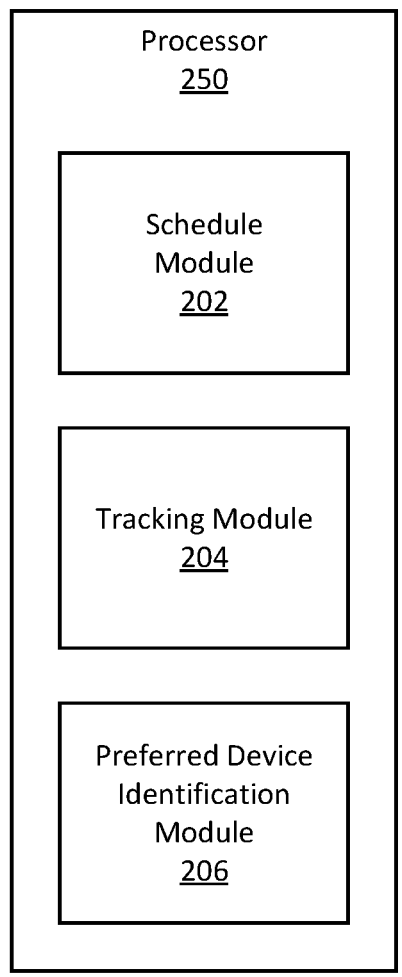
FIG. 2 is a block diagram illustrating one embodiment of a processor configured to improve workload performance using data locality and workload placement.

FIG. 2 is a block diagram illustrating one embodiment of a processor 250 configured to improve workload performance using data locality and workload placement. In certain embodiments, as used herein, the processor 250 may be a general-purpose computer, special-purpose computer, multiple processors, or other programmable data processing apparatus. In some embodiments, the processor 250 may be a processor capable of directing the storage of data on storage devices such as those described above in connection with FIG. 1 in the depicted embodiment. The processor 250 may include a schedule module 202, a tracking module 204, and a preferred device identification module 206. As described herein, the schedule module 202 may schedule one or more undispatched workloads 110 for execution on a computing device 130 in one or more computing devices 130, wherein the one or more computing devices 130 access a shared data storage 170. Further, as described herein, the tracking module 204 may maintain a data store (such as the dispatch tracking data store 122) that associates one or more paths in the shared data storage 170 with one or more dispatched workloads and associates the one or more paths with at least one computing device 130 in the one or more computing devices 130, wherein a dispatched workload in the one or more dispatched workloads and the at least one computing device 130 accessed a path in the one or more paths. Also, as described herein, the preferred device identification module 206 may identify one or more preferred computing devices in the one or more computing devices 130 for executing undispatched workloads based on information in the data store, wherein the schedule module 202 schedules the execution of the undispatched workloads in response to the identified one or more preferred computing devices.

In certain embodiments, the schedule module 202 may be configured to schedule workloads for execution on computing devices 130 that share a data storage 170. A schedule module 202 may include the workload manager 102, where the workload manager 102 includes a workload queue 104 and a dispatcher 106. The schedule module 202 may maintain the workload queue 104 that identifies undispatched workloads 110 for execution on the computing devices 130 and control the dispatching of the undispatched workloads 110 to the computing devices 130. For example, the schedule module 202 may identify an undispatched workload 110 in the workload queue 104 to be dispatched by the dispatcher 106. The schedule module 202 may provide the identified undispatched workload 110 to the dispatcher 106. In some embodiments, when the dispatcher 106 receives an undispatched workload 110 to dispatch to one of the computing devices 130, the dispatcher 106 may select a computing device 130 based on information describing previously dispatched workloads for execution by the computing devices 130.

In some embodiments, the tracking module 204 may be configured to track information regarding workloads that have been dispatched for execution by the computing devices 130. For example, the tracking module 204 may execute as part of the placement improver 120 and may be configured to communicate with the schedule module 202 to acquire information regarding workloads that have been dispatched. Also, the tracking module 204 may store information describing the computing devices 130 that execute the various workloads.

In certain embodiments, the tracking module 204 communicates with the workload manager 102 to acquire information regarding the undispatched workloads 110 in the workload queue 104. For example, the tracking module 204 may direct the placement improver 120 to communicate with the workload manager 102 to identify the undispatched workloads 110 within the workload queue 104. After communicating with the workload manager 102 to identify the undispatched workloads 110 within the workload queue 104, the tracking module 204 may maintain a record of the undispatched workloads 110 that were in the workload queue 104 at the time of the most recent communication between the placement improver 120 and the workload manager 102. In subsequent communications between the tracking module 204 and the workload manager 102, the tracking module 204 may determine which workloads have been dispatched by the dispatcher 106 by identifying workloads identified as undispatched workloads 110 in previous communications that are no longer identified in the workload queue 104.

Upon identifying dispatched workloads, the tracking module 204 may communicate with the dispatcher 106 to acquire information regarding the dispatch of the particular workload. For example, the tracking module 204 may acquire information about which computing device 130 is or has executed a dispatched workload. The tracking module 204 may then save the information regarding the dispatched workloads within the dispatch tracking data store 122.

In certain embodiments, the tracking module 204 may maintain a record of the size of the local disk caches 155 for each of the separate computing devices 130. For example, the tracking module 204 may communicate directly with the computing devices 130 to acquire the size particular local disk cache 155. Alternatively, the tracking module 204 may be preprogrammed with information regarding size of the local disk caches 155 for the multiple computing devices 130 within the computing system 100. Further, the workload manager 102 may communicate the size of the local disk caches 155 for the computing devices 130 in the computing system 100 to the tracking module 204. The tracking module 204 may store the size of the local disk caches 155 for the separate computing devices 130 in the computing system 100 in the dispatch tracking data store 122.

In further embodiments, the tracking module 204 may also maintain a record of a path to a cached file system for the separate computing devices 130. As used herein, a path may refer to a network file location through which the computing device 130 stores data. For example, each computing device 130 may have a path to the shared file system. For instance, computing device 130-1 may have a path such as "/path-to-shared-filesystem" where the path may be a network drive or other network location through which the computing device 130-1 may acquire data stored on a shared file system such as data storage 170. In certain embodiments, the path to the shared file system may be the same for each of the computing devices 130 in the computing system 100. Accordingly, the tracking module 204 may store the path within the dispatch tracking data store 122. Alternatively, the path the shared file system may be unique for some or each of the computing devices 130 in the computing system 100. Thus, the tracking module 204 may store each path to the shared file system and associate the path with a respective computing device 130 within the dispatch tracking data store 122.

In additional embodiments, the tracking module 204 may identify the data saved on a local disk cache 155 for a particular computing device 130 by identifying the data saved in the path. For example, the data saved at a particular path on the computing device 130 may be represented by "mydata". Thus, the tracking module 204 may identify the data saved on a local disk cache 155 for a particular computing device 130 by searching for the data stored underneath the path "/path-to-shared-filesystem/mydata". As used herein, the phrase "mydata" may represent data stored on a local disk cache 155 for one workload or multiple workloads that have been executed by a particular computing device 130.

In certain embodiments, the tracking module 204 may save path information within the dispatch tracking data store 122 to facilitate the assigning of workloads to computing devices 130. As discussed above, the tracking module 204 may save information related to the path to a shared file system from a computing device 130. The information related to the path may be saved within the dispatch tracking data store 122 as a path identifier. For example, for each computing device 130 in the computing system 100, the tracking module 204 may save a path identifier that identifies the path to the shared file system for each computing device 130.

In additional embodiments, the tracking module 204 may save the size of the data stored in association with the path. For example, the tracking module 204 may save, in the dispatch tracking data store 122, the size of the data that is saved in the path associated with the shared file system that is saved in the local disk cache 155 for the different computing devices 130 within the computing system 100.

In certain embodiments, the tracking module 204 may save workload identifiers that identify the one or more dispatched workloads that have accessed the path. For example, the tracking module 204 may query the workload manager 102 for information regarding dispatched workloads. As part of the query, the tracking module 204 may provide a path identifier. In response to receiving a query having a path identifier, the workload manager 102 may provide workload identifiers that identify the dispatched workloads that have accessed data in a path associated with the path identifier. Additionally, the path information, saved by the tracking module 204, may describe one or more computing devices 130 that processed dispatched workloads that have accessed data through the associated path. For example, in response to the query to the workload manager 102 for information regarding dispatched workloads, the workload manager 102 may identify computing devices 130 that are executing dispatched workloads associated with the path identifier provided to the workload manager 102. Accordingly, the path information may identify computing devices 130, workloads executed by particular computing devices 130, and the data stored within a local disk cache 155 that is used by a respective computing device 130 to execute the workloads.

In some embodiments, the tracking module 204 may save processing times that indicate when a computing device 130 processes a dispatched workload that accesses data through a particular path. For example, the tracking module 204 may communicate with the workload manager 102 with regards to a particular path identifier. The workload manager 102 may provide a processing time to the tracking module 204. As used herein, a processing time may refer to a time of processing by a computing device 130 of a particular workload that accessed the path associated with the path identifier. In further embodiments, the tracking module 204 may save a frequency that indicates how often a computing device 130 has processed a dispatched workload that accesses data through a particular path. For example, the tracking module 204 may communicate with the workload manager 102 with regards to a particular path identifier. The workload manager 102 may provide information describing how often, or the frequency with which, a workload has been executed by a computing device 130. Alternatively, the tracking module 204 may calculate a frequency for a particular workload based on the saved processing times for the workload that are associated with a particular computing device 130.

In additional embodiments, the preferred device identification module 206 may be configured to identify preferred computing devices for executing on dispatched workloads based on information in a data store, such as the dispatch tracking data store 122. For example, the preferred device identification module 206 may communicate with the workload manager 102 by requesting information regarding the undispatched workloads 110 within the workload queue 104. In response to a request from the preferred device identification module 206, the workload manager 102 may provide workload identifiers for the undispatched workloads 110 within the workload queue 104 to the preferred device identification module 206. Also, the workload manager 102 may provide information regarding the data to be accessed by the undispatched workload 110. From the information provided by the workload manager 102, the preferred device identification module 206 may determine which computing devices 130 in the computing system 100 are preferred for executing a particular undispatched workload 110. When the preferred device identification module 206 determines which computing devices 130 are preferred for executing particular undispatched workloads 110, the preferred device identification module 206 may provide identifications of preferred computing devices for the different undispatched workloads 110 in the workload queue 104 to the workload manager 102. The workload manager 102 may then attach the identifications of the preferred computing devices for the associated undispatched workload 110 in the workload queue 104.

In certain embodiments, when the dispatcher 106 retrieves an undispatched workload 110 from the workload queue 104, the dispatcher 106 may also retrieve the identifications of the preferred computing devices associated with the retrieved undispatched workload 110. The dispatcher 106 may then attempt to dispatch the undispatched workload 110 to one or more of the identified preferred computing devices for the execution of the undispatched workload 110. Accordingly, the dispatcher 106 may dispatch workloads to computing devices 130 that may already have data stored within a respective local disk cache 155 to facilitate the execution of the dispatched workload without having to retrieve the data from a shared file system represented by the data storage 170.

Figure 3:
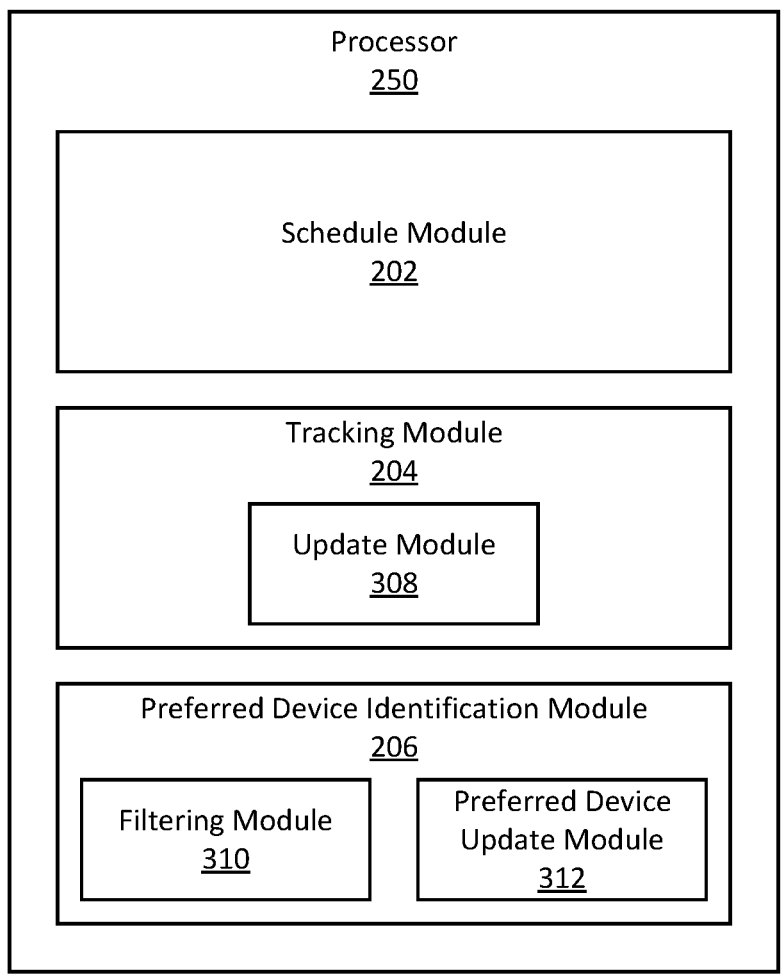
FIG. 3 is a block diagram illustrating a further embodiment of a processor configured to improve workload performance using data locality and workload placement.

FIG. 3 is a block diagram illustrating a further embodiment of a processor 250 configured to improve workload performance using data locality and workload placement. The processor 250, in various embodiments, may be substantially similar to the processor 250 described above with regards to FIG. 2. In the depicted embodiment, the processor 250 may include a schedule module 202, a tracking module 204, and a preferred device identification module 206, which may be figured substantially similar as described above with regards to the schedule module 202, the tracking module 204, and the preferred device identification module 206 of FIG. 2. Additionally, the tracking module 204 may include an update module 308. As described herein, the update module 308 may update path information that has been acquired by the tracking module 204 in response to an undispatched workload 110 being dispatched by the dispatcher 106 to a computing device 130. Further, the preferred device identification module 206 may include a filtering module 310 and a preferred device update module 312. As used herein, the filtering module 310 may filter paths associated with computing devices 130 for suggesting computing devices 130 for executing undispatched workloads 110. As used herein, the preferred device update module 312 may identify computing devices 130 that would be preferred for executing undispatched workloads 110.

In some embodiments, the update module 308 updates path information by examining dispatched workload information for one or more dispatched workloads. For example, the update module 308 of the placement improver 120 may periodically communicate with the workload manager 102 to acquire information about the undispatched workloads in the workload queue 104. When the update module 308 acquires the information from the workload manager 102, the update module 308 may compare the information against previously acquired information from the workload manager 102 that describes the undispatched workloads that were in the workload queue 104 at a previous moment in time. The update module 308 may identify differences in the workload queue 104 from the most recently acquired information and information previously acquired from the workload manager 102. From these differences, the update module 308 may determine which workloads have been dispatched for execution on the computing devices 130. When the update module 308 determines which workloads have been dispatched, the update module 308 may communicate with the workload manager 102 to acquire information about the dispatched workloads. Upon receiving the information from the workload manager regarding the dispatched workloads, the update module 308 may examine dispatched workload information and update the dispatch tracking data store 122 with information regarding the dispatched workloads.

In certain embodiments, the update module 308 may retrieve paths that are used by the dispatched workloads when executed by a particular computing device 130. For example, upon identifying the dispatched workloads, the update module 308 may indicate to the workload manager 102 to acquire information about the paths associated with the dispatched workloads. The workload manager 102 may then provide path information regarding the data that was used by a computing device 130 to execute the dispatched workload. Further, the update module 308 may retrieve a size of data stored under the path used by the computing device 130 to execute the identified dispatched workload. For example, the size of the data stored under the path may represent the size of the data stored on the local disk cache 155 that is associated with the dispatched workload. Additionally, the update module 308 may retrieve computing device information for the computing device 130 that executes the dispatched workload. For example, the update module 308 may acquire computing device information from the workload manager 102 that describes characteristics of the computing device 130 that are pertinent to the execution and dispatching of workloads. Computing device information may include data that describes the size of the local disk cache 155, the amount of data stored on the local disk cache 155, processing capabilities, how often the data stored on the local disk cache 155 has been accessed and the times that the data was accessed, the amount of workloads dispatched to a particular computing device 130, among other information that may be useful for determining whether or not to dispatch a workload to the particular computing device 130. When the update module 308 acquires information regarding the paths, data, and computing devices, the update module 308 may store the information in the dispatch tracking data store 122 where the information may be subsequently used to determine which computing devices 130 would be preferred for executing undispatched workloads 110 identified in the workload queue 104.

In some embodiments, the filtering module 310 may arrange the paths to data stored on the local disk caches 155 of the computing devices 130 for determining whether or not the data should be used for subsequent dispatching of workloads. For example, the filtering module 310 may filter small paths from the paths stored on the local disk caches 155 of the computing devices 130. To filter the small paths, the filtering module 310 may identify the paths on local disk caches 155 that are smaller than a size threshold. When the filtering module 310 identifies paths that are smaller than a size threshold, the filtering module 310 may identify the paths as small paths. In some embodiments, the preferred device identification module 206 may suggest computing devices 130 that have paths associated with data greater than the size threshold.

In additional embodiments, the filtering module 310 may filter aged paths from the paths stored on the local disk caches 155 of the computing devices 130. For example, to filter the aged paths, the filtering module 310 may identify the paths on local disk caches 155 that have access times that are older than a time threshold. To determine that an access time is older than a time threshold, the filtering module 310 may identify the most recent time that data associated with a path has been accessed. The filtering module 310 may then determine the access time by subtracting the most recent time from the present time. If the access time is greater than the time threshold, the filtering module 310 may determine that the path associated with the access time is an aged path. When the filtering module 310 identifies paths having access times that are older than the time threshold, the preferred device identification module 206 may suggest computing devices 130 that have paths with data having access times less than the time threshold.

In further embodiments, the filtering module 310 may filter infrequent paths in the paths stored on the local disk caches 155 of the computing devices 130. For example, to filter the infrequent paths, the filtering module 310 may identify the paths on local disk caches 155 that have access frequencies smaller than a frequency threshold. To determine that an access frequency is more than a frequency threshold, the filtering module 310 may identify the different times that data associated with the path has been accessed. From this information, the filtering module 310 may then determine the frequency with which the data has been accessed. If the access frequency is smaller than a frequency threshold, the filtering module 310 may determine that the path associated with the access frequency is an infrequent path. When the filtering module 310 identifies infrequent paths, the preferred device identification module 206 may suggest computing devices 130 that have paths with data having access frequencies greater than the frequency threshold. The preferred device identification module 206 may use the filter information regarding the paths when suggesting workload placements for the dispatching of undispatched workloads 110.

In certain embodiments, the preferred device update module 312 may identify preferred computing devices, where identification of the preferred computing devices may be attached to an undispatched workload 110 in the workload queue 104. To identify the preferred computing devices, the preferred device update module 312 may use information stored in the dispatch tracking data store 122 that has been gathered by the update module 308 and the tracking module 204. Additionally, the preferred device update module 312 may use the information in the dispatch tracking data store 122 that has been filtered by the filtering module 310. From this information, the preferred device update module 312 may create a list suggesting one or more computing devices 130 for executing an undispatched workload 110 identified in the workload queue 104. Upon creating the list of preferred computing devices, the preferred device identification module 206 may provide the identifiers of the preferred computing devices to the workload manager 102, where the identifiers of the preferred computing devices may be attached to the associated undispatched workload 110. When the associated undispatched workload 110 is dispatched by the dispatcher 106, the dispatcher 106 may attempt to dispatch the workload to a computing device 130 identified in the list of preferred computing devices.

In some embodiments, to create the list of preferred computing devices, the preferred device update module 312 may examine paths to the shared data storage 170 that are to be accessed by an undispatched workload 110. When the preferred device update module 312 identifies the paths to be accessed by an undispatched workload 110, the preferred device update module 312 may then identify the stored paths on the local disk caches 155. For example, the preferred device update module 312 may identify a stored path identified in the dispatch tracking data store 122, where a stored path identified in the dispatch tracking data store 122 identifies the stored paths on the local disk caches 155 of the computing devices 130. Alternatively, the preferred device update module 312 may communicate with the workload manager 102 to acquire information from the computing devices regarding the paths stored on the local disk caches 155 of the computing devices 130.

In further embodiments, when the preferred device update module 312 has identified the stored paths on the local disk caches 155 and paths to be accessed by the undispatched workloads 110, preferred device update module 312 may compile a list of computing devices for a particular undispatched workload 110 based on entries of the stored paths on the local disk caches 155 that match the one or more paths to be accessed by the particular undispatched workload 110. For example, the preferred device update module 312 may compare the list of data paths on the dispatch tracking data store 122 that are currently stored on the local disk caches 155 against the data paths that may be accessed by a particular undispatched workload 110. Based on this comparison, the preferred device update module 312 may identify the computing devices 130 that have data paths stored on their respective local disk caches 155, where the data paths match the data paths to be accessed by the particular undispatched workload 110. The preferred device update module 312 may store the identified computing devices 130 on a list of preferred computing devices.

In additional embodiments, when the preferred device update module 312 has identified the computing devices 130 that have data paths stored on the respective local disk caches 155 that may be accessed by a particular undispatched workload 110 and stored the computing devices 130 on a list of preferred computing devices, the preferred device update module 312 may assign a preference to the one or more computing devices 130 that are identified on the list of preferred computing devices. Further, when preferred device update module 312 has determined the preference of the one or more computing devices 130 identified in the list of preferred computing devices, the preferred device identification module 206 may provide the list of preferred computing devices to the workload manager 102. The workload manager 102 may attach the list of preferred computing devices to an associated undispatched workload 110 as the preferred computing devices for undispatched workload 110. When the dispatcher 106 dispatches dispatched workload 110, based on the preference of the one or more computing devices 130 identified in the list of preferred computing devices, the dispatcher 106 may attempt to assign the undispatched workload 110 to computing devices 130 based on the preference described in the preferred computing devices associated with the undispatched workload 110.

In some embodiments, the preferred device update module 312 may determine the preference for the computing devices 130 identified in the list of preferred computing devices based on a number of paths that a prospective computing device 130 has accessed that are to be used by the respective undispatched workload. For example, when an undispatched workload 110 executes, the executing computing device 130 may access three different data paths. When creating the list of preferred computing devices for the undispatched workload 110, the preferred device update module 312 may attempt to identify a computing device 130 that has accessed the three separate data paths associated with the undispatched workload 110 in order to find a computing device 130 that already has the data to be used for the execution of the undispatched workload 110 stored in the local disk cache 155 of the computing device 130. If a first computing device 130 has two of the three paths stored in the respective local disk cache 155 and a second computing device 130 has one of the three paths stored in the respective local disk cache 155, the preferred device update module 312 may give the first computing device 130 a higher preference than the second computing device 130.

Additionally, the preferred device update module 312 may determine the preference for the computing devices 130 identified in the list of preferred computing devices based on a size of data for the paths that a prospective computing devices access that are to be used by a respective undispatched workload 110. For example, when an undispatched workload 110 executes, the computing device 130 may access a first data path and a second data path, where the first data path is larger than the second data path. Accordingly, a first computing device 130 may have the first data path stored in an associated first local disk cache 155 and a second computing device 130 may have a second data path stored in an associated second local disk cache 155. Thus, the preferred device update module 312 may give the first computing device 130 a higher preference than the second computing device 130 because the first data path stored on the first local disk cache 155 is greater than the second data path stored on the second local disk cache 155.

Further, the preferred device update module 312 may determine the preference for the computing devices 130 identified in the list of preferred computing devices based on a frequency of access for the paths that the prospective computing device 130 has accessed that may be used by a respective undispatched workload 110. For example, an undispatched workload 110 may frequently be executed by one or more of computing devices 130. Accordingly, data paths accessed during execution of the undispatched workload 110 may be frequently accessed due to the frequency of execution of the undispatched workload 110. Further, an undispatched workload 110 may access multiple data paths, where the execution of the undispatched workload 110 may be more frequent for a subset of the accessed data paths accessed by the undispatched workload 110. For example, an undispatched workload 110 may access the first data path and a second data path, where the undispatched workload 110 accesses the second data path more frequently than the first data path. A first computing device 130 in the list of preferred computing devices may have the second data path stored within a local first local disk cache 155. Also, a second computing device 130 in the list of preferred computing devices may have the first data path stored within a local second local disk cache 155. Thus, the preferred device update module 312 may give the first computing device 130 a higher preference than the second computing device 130 because the second data path stored on the first local disk cache 155 may be accessed with greater frequency than the first data path stored on the second local disk cache 155.

In certain embodiments, when the preferred device update module 312 has assigned a preference to the computing devices 130 identified in the list of preferred computing devices, the preferred device identification module 206 may provide identifiers of preferred computing devices to the schedule module 202 executing on the workload manager 102. The schedule module 202 may then schedule the dispatching of the undispatched workloads 110 through the dispatcher 106. When scheduling the undispatched workloads 110, the schedule module 202 may attempt to schedule computing devices identified as preferred computing devices for the undispatched workload 110. Further, when the schedule module 202 schedules the undispatched workloads 110, the schedule module 202 may attempt to assign the undispatched workloads 110 to the computing devices 130 according to the preference of the computing devices 130 identified in the list of preferred computing devices.

Figure 4:
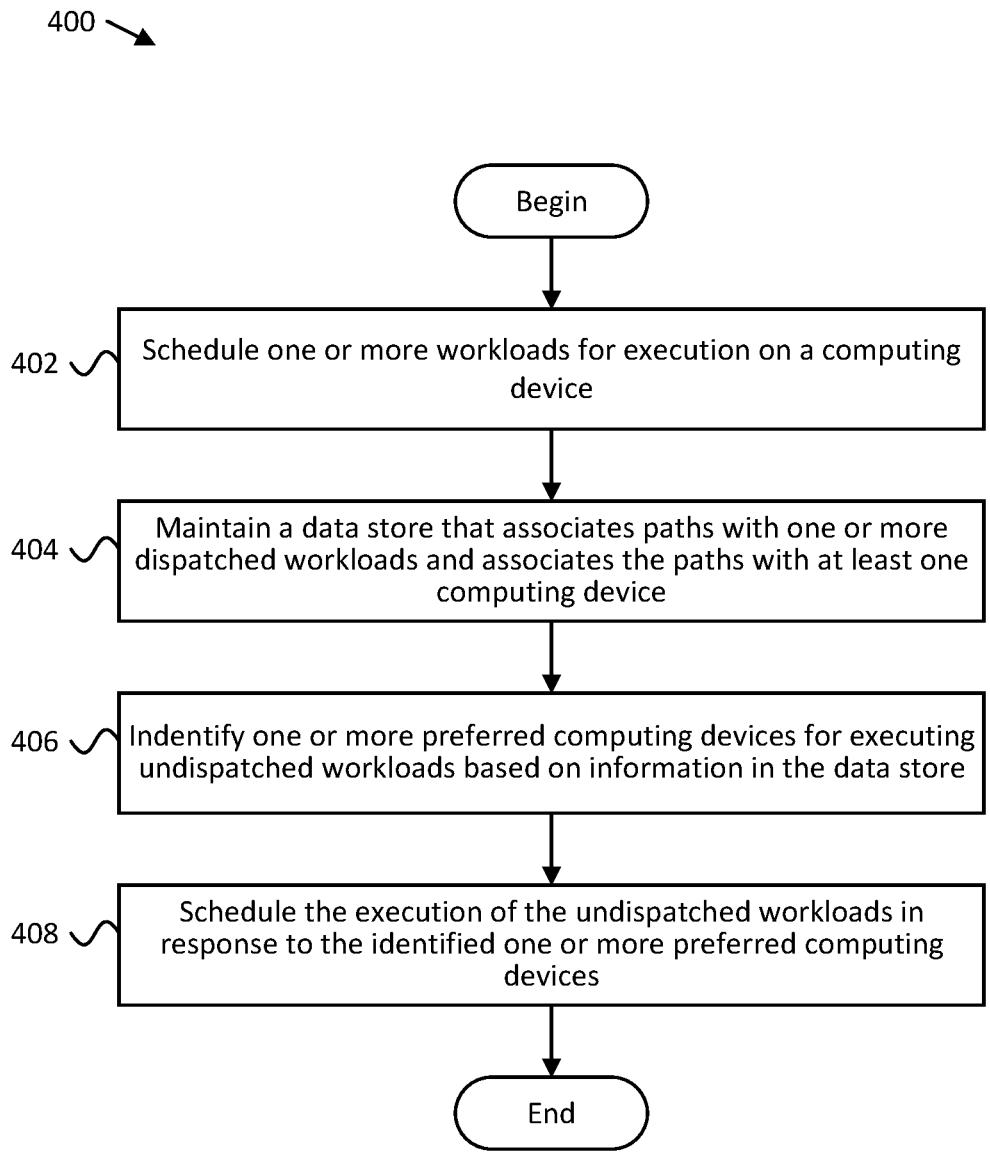
FIG. 4 is a flowchart diagram illustrating one embodiment of a method for improving workload performance using data locality and workload placement.

FIG. 4 is a flowchart diagram illustrating one embodiment of a method 400 for improving workload performance using data locality and workload placement. Method 400 begins at 402 where one or more workloads are scheduled for execution on a computing device. Further, method 400 proceeds at 404 where a data store is maintained that associates paths one or more dispatched workloads and associates the paths with at least one computing device 130. Additionally, method 400 proceeds at 406 where one or more preferred computing devices 130 are identified for executing undispatched workloads based on information in the data store. Also, method 400 proceeds at 408 where the execution of the undispatched workloads is scheduled response to the identified one or more preferred computing devices 130. Method 400 then ends.

Figure 5:
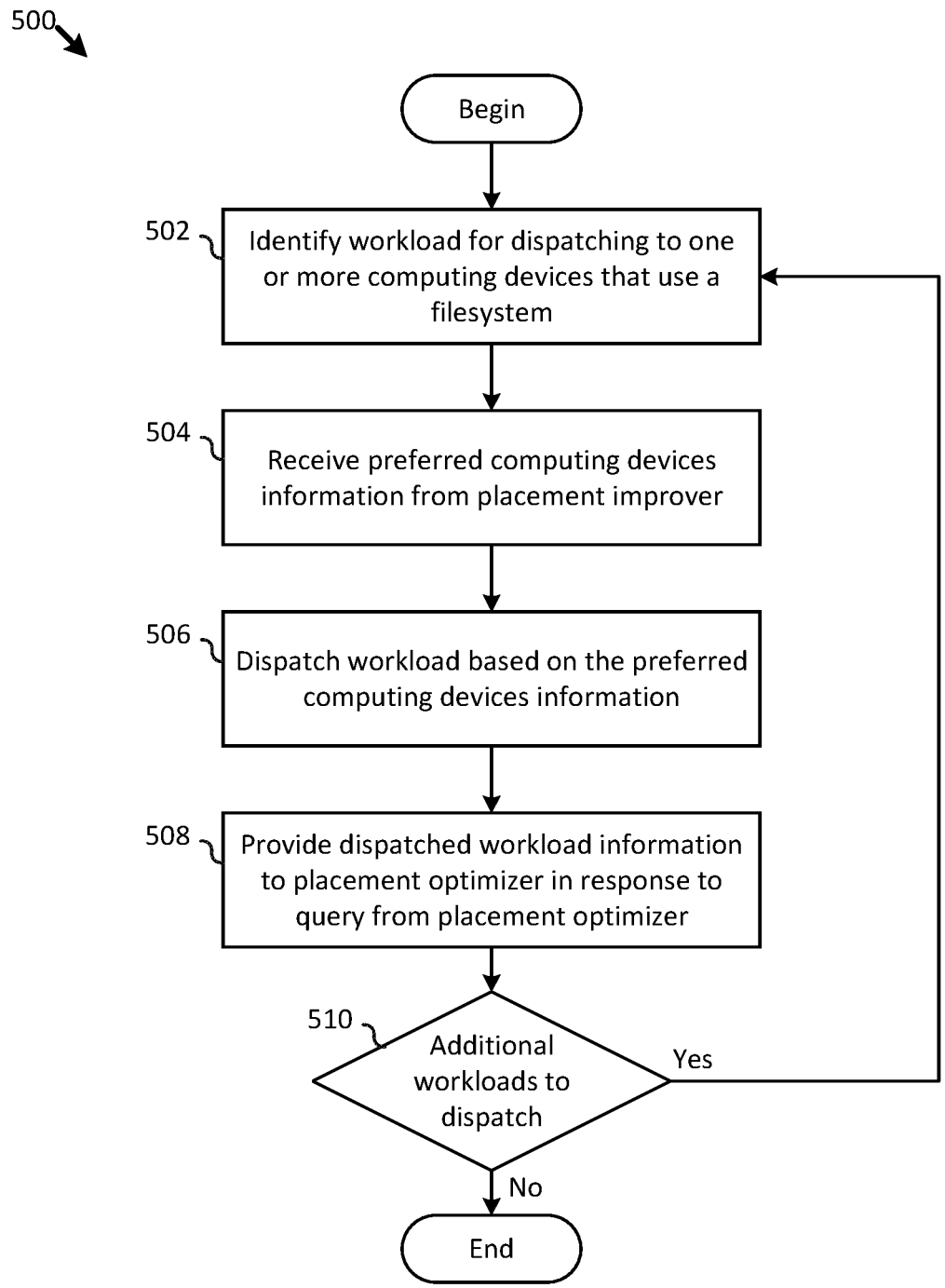
FIG. 5 is a flowchart diagram illustrating one embodiment of a method for dispatching jobs using data locality and workload placement.

FIG. 5 is a flowchart diagram illustrating one embodiment of a method 500 for dispatching jobs using data locality and workload placement. Method 500 begins at 502 where a workload is identified for dispatching to one or more computing devices that use a filesystem. Additionally, method 500 proceeds at 504 where preferred computing devices information is received from a placement improver 120. Also, method 500 proceeds at 506 where a workload is dispatched based on the preferred computing devices information. Further, method 500 proceeds at 508 where dispatched workload information is provided to the placement improver 120 in response to a query from the placement improver 120. Method 500 then proceeds at 510 where it is determined whether or not there are additional workloads to dispatch. If there are additional workloads to dispatch, the method 500 returns to 502. Conversely, if there are no additional workloads to dispatch, the method 500 ends.

Figure 6:
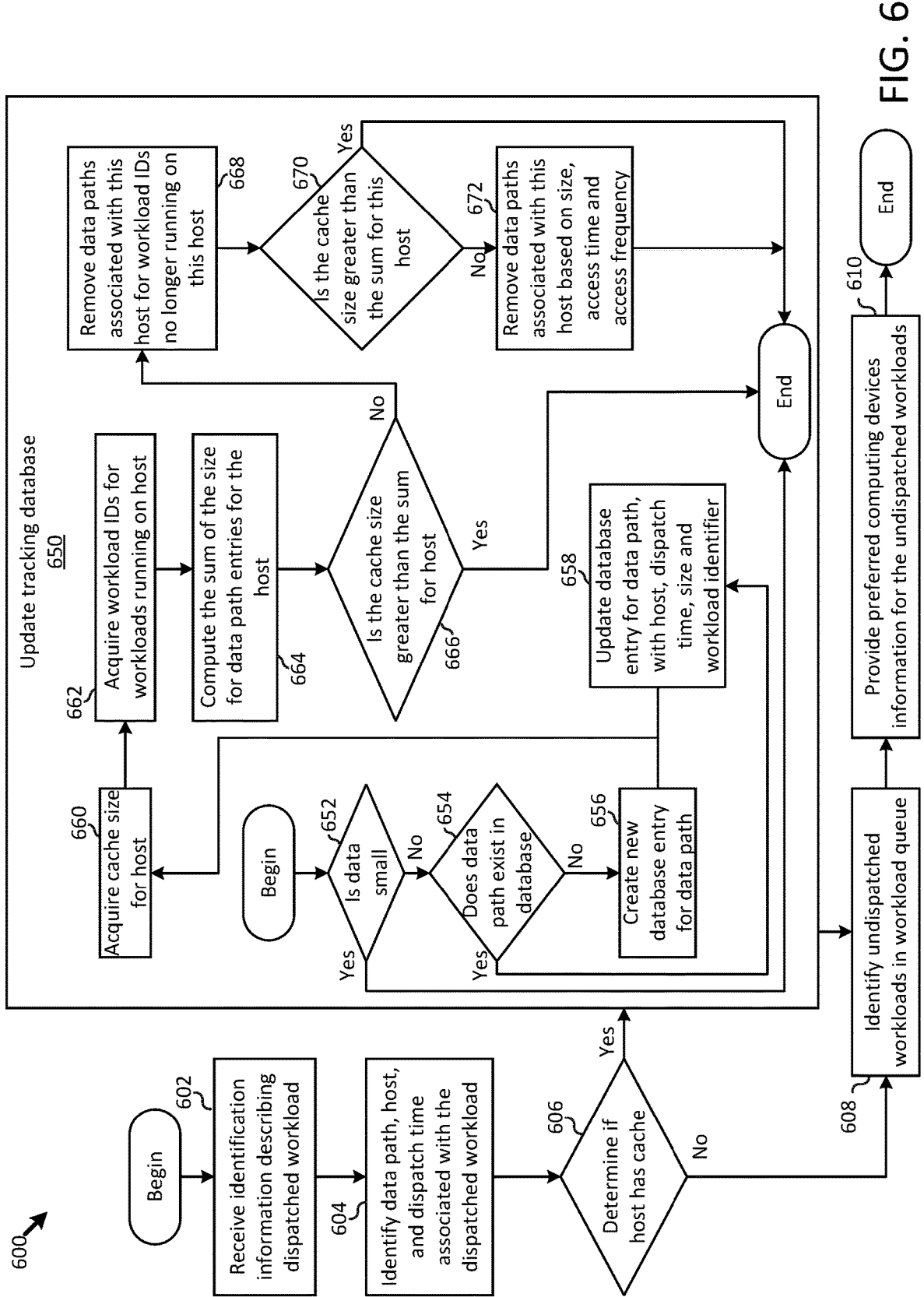
FIG. 6 is a flowchart diagram illustrating one embodiment of a method for updating a tracking database using data locality and workload placement.

FIG. 6 is a flowchart diagram illustrating one embodiment of a method 600 for updating a tracking database based on data locality and workload placement. Method 600 may be performed by the placement improver 120, the schedule module 202, the tracking module 204, the preferred device identification module 206, a processing device, and the like. Method 600 begins at 602 where identification information is received that describes a dispatched workload. For example, the placement improver 120 may communicate with the workload manager 102 to acquire a workload identification number for a dispatched workload. Additionally, method 600 proceeds at 604 where a data path, host, and dispatch time associated with a dispatched workload are identified. For example, when the dispatcher 106 dispatches a workload, the dispatcher 106 may provide the data paths associated with the dispatched workload, the computing device 130 that was assigned to execute the dispatched workload, and a time that the workload was dispatched to the designated computing device 130.

In certain embodiments, upon identifying information regarding the computing device 130 associated with the dispatched workload, the method 600 proceeds at 606, where it is determined whether the host device (computing device) has a local disk cache 155. If the computing device 130 does not have a local disk cache 155, the method 600 proceeds at 608 where an undispatched workload 110 is identified in the workload queue 104. Additionally, the method 600 proceeds at 610, where preferred computing devices information is provided for the undispatched workload.

In some embodiments, if the method 600 determines that the host device has a local disk cache 155, the method 600 proceeds with performing the method 650 for updating a tracking database such as the dispatch tracking data store 122, which functions as a data store for information regarding the dispatching of workloads on various computing devices 130. Method 650 begins at 652, where the method 650 determines whether data associated with a workload is small. For example, the method 650 may determine whether the size of the data path associated with the workloadis below a threshold. If the size of the data is small, i.e. below a size threshold, the suggestion of the device associated with a particular path may not provide a sufficient performance advantage to justify the updating of the tracking database. Accordingly, if the size of the data is small, method 650 ends and method 600 proceeds at 608 where an undispatched workload may be identified in the workload queue 104.

In certain embodiments, if the method 650 determines that the size of the data associated with a path on the local disk cache 155 is not small or is above a size threshold, the method 650 may proceed at 654 where the method 650 determines if a data path exists in the database for the host associated with the local disk cache. If the data path does not exist in the database, the method 650 may proceed at 656 where a new database entry is created for the data path. In at least one implementation, the new database entry may include information describing the data path, host, workload identifiers, dispatch time, and size. When the new database entry is created, the method 650 proceeds at 660, where the cache size is acquired for the host. Alternatively, if the method 650 determines that the data path exists in the database, the method 650 may proceed at 658 where the database entry is updated for the data path. When the database entry is updated, the host information dispatch time, size of the data path, workload identifier, among other information in the database entry may be updated. When the database entry is created, the method 650 may proceed at 660, where a cache size is acquired for the host.

In some embodiments, when the method 650 has acquired the cache size for the host, the method 650 proceeds at 662, where the workload identifier for workloads running on a host are acquired. When the workload identifiers are acquired, the method 650 may proceed at 664, where the sum of the size for data path entries for the host are computed. For example, for each local disk cache 155 identified in the dispatch tracking data store 122, the dispatch tracking data store 122 may maintain a record of the different paths that are stored in a particular local disk cache 155. Further, for each path identified in the dispatch tracking data store 122, the dispatch tracking data store 122 may also identify the size of any paths identified within the dispatch tracking data store 122. Thus, the placement improver 120 may calculate a sum of the path sizes for the paths identified in a dispatch tracking data store 122 that are associated with a particular computing device 130.

When the sum is computed for the host, the method 650 determines at 666, whether the cache size of the host is greater than the computed sum for the host. For example, a placement improver 120 may use a device identification to identify the size of the local disk cache 155 for a particular computing device 130. Alternatively, the placement improver 120 may communicate with the workload manager 102 to acquire a size of the local disk cache 155 for a particular computing device 130. If the size of the local disk cache 155 for the host is greater than the sum of workloads running on the host, method 650 ends. Conversely, if the cache size for the host is less than the sum of workloads running on the host, the method 650 may proceed at 668 where data paths associated with the host that are no longer running on the host are removed from the database. When the sum of the cached path sizes associated with the computing device 130 are greater than the size of the local disk cache 155 for the computing device 130, parts of the cached path sizes associated with the computing device 130 have been flushed from the local disk cache 155. Accordingly, the placement improver 120 may communicate with the workload manager 102 to determine which workloads are currently executing on the computing device 130. From the information regarding currently executing workloads, the placement improver 120 may determine which cached paths are not currently being accessed on the computing device 130. If there are cached paths that are not being accessed by the currently executing workloads, the placement improver 120 may disassociate the computing device 130 with the cached paths that are not being accessed on the computing device 130.

When the non-executing entries are deleted from the tracking database (such as the dispatch tracking data store 122), the method 650 proceeds at 670 where the placement improver 120 again determines if the cache size of the host is greater than the computed sum for the host after the removal of data paths associated with the host in the tracking database that are not running on the host. If the cache size is greater than the computed sum, the method 650 ends. Conversely, when the method 650 determines that the sum of the cached path sizes associated with a computing device 130 is greater than the cache size of an associated local disk cache 155, the method 650 may proceed at 672 where paths associated with the device are removed based on the size of the cached path, access time, and access frequency. For example, the placement improver 120 may identify the cached paths having the smallest data size. Also, the placement improver 120 may identify the cached paths having the smallest access frequency. With this information, the placement improver 120 may determine which cached paths are most advantageous to disassociate with the computing device 130. For example, cached paths having a small data size may be loaded back into a local disk cache 155 or loaded from the data storage 170 without substantially affecting the execution of a workload. Also, cached paths having a high access frequency may be maintained in a local disk cache 155 due to the frequent nature of the cached path being accessed by an executing workload. Accordingly, the placement improver 120 may determine which cached paths to disassociate with the computing device 130.

In certain embodiments, when the method 650 has removed paths associated with a device based on information regarding cached paths on the local disk cache 155 method 650 ends and method 600 proceeds at 608 where undispatched workloads are identified in the workload queue. Further, method 600 proceeds at 610 where preferred computing devices information is provided for the undispatched workloads. Method 600 then ends.

Figure 7:
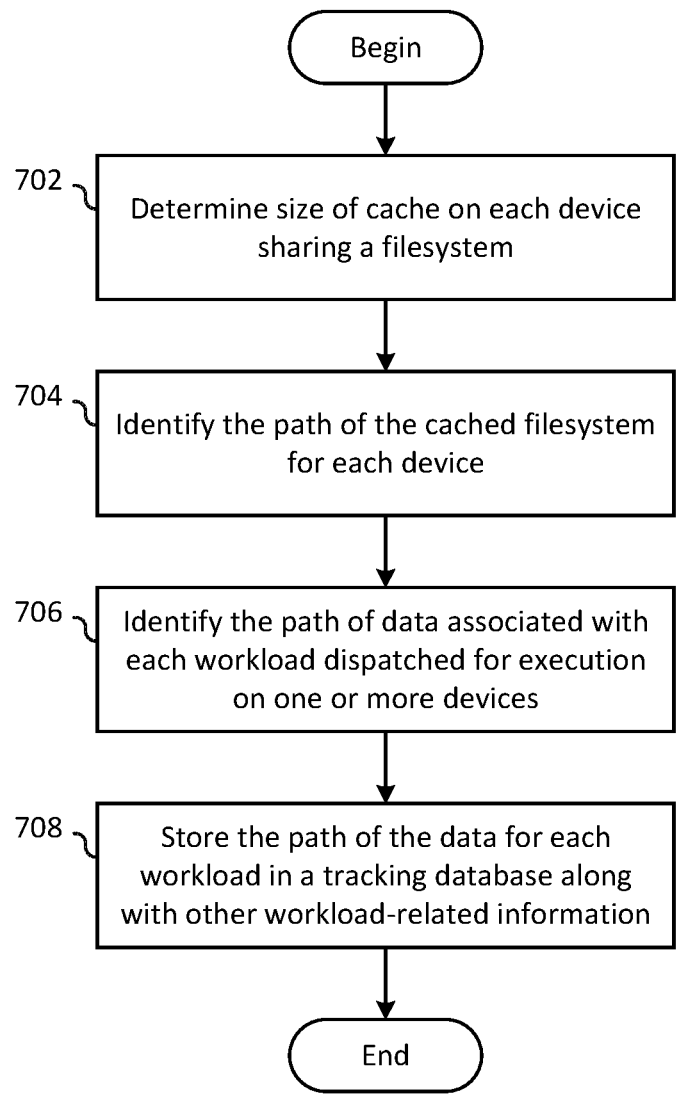
FIG. 7 is a flowchart diagram illustrating one embodiment of a method for storing information concerning data locality and workload placement in a tracking database.

FIG. 7 is a flowchart diagram illustrating one embodiment of a method 700 for storing information concerning data locality and workload placement in a tracking database. For example, method 700 proceeds at 702, where a size of cache on each devices sharing a file system is determined. Additionally, method 700 proceeds at 704, where the path of the cached file system is identified for each device. Further, method 700 proceeds at 706, where the path of data associated with each workload dispatched for execution on one or more devices is identified. Also, method 700 proceeds at 708, where the path of the data for each workload is stored in a tracking database along with other workload-related information. Method 700 then ends.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system comprising:
   a schedule module that schedules workloads for execution on a plurality of computing devices, wherein the plurality of computing devices access data on a shared data storage device;
   a tracking module that maintains a data store that:
      associates a plurality of paths in the shared data storage device with a plurality of dispatched workloads in the workloads, wherein each dispatched workload in the plurality of dispatched workloads is associated with a respective path in the plurality of paths utilized to retrieve the data corresponding to a respective workload stored on the shared data storage device and utilized to perform the respective dispatched workload,
      associates the plurality of paths with a plurality of computing devices, wherein each computing device in the plurality of computing devices is associated with a respective path in the plurality of paths utilized by each associated computing device to retrieve the data stored on the shared data storage device for performing one or more dispatched workloads in the plurality of dispatched workloads, and
      associates the data corresponding to each respective workload stored on the shared data storage device with a corresponding computing device in the plurality of computing devices based on:
         the association of the plurality of paths and the plurality of dispatched workloads, and
         the association of the plurality of paths and the plurality of computing devices; and
   a preferred device identification module that identifies a preferred computing device in the plurality of computing devices for executing a particular undispatched workload in a plurality of undispatched workloads based on the association of the preferred computing device to data utilized by the preferred computing device to perform a previous dispatched workload that is the same data utilized to perform the particular undispatched workload,
   wherein:
      the schedule module schedules the execution of the particular undispatched workload in response to identifying the preferred computing device, and
      at least a portion of each of said modules comprises one or more of a set of hardware circuits, a set of programmable hardware devices, and executable code stored on a set of non-transitory computer-readable storage media.

2. The system of claim 1, wherein:
   the data store comprises path information that describes the plurality of paths; and
   the path information for a path in the plurality of paths comprises at least one of:
      a path identifier;
      a size of data stored in association with the path,
      one or more workload identifiers that identify the plurality of dispatched workloads that utilized the path,
      the computing device that processed the plurality of dispatched workloads utilizing the path, one or more processing times when the computing device processed the plurality of dispatched workloads utilizing the path, and a frequency of how often the computing device processed the plurality of dispatched workloads utilizing the path.

3. The system of claim 1, wherein the tracking module comprises an update module that updates path information in the data store in response to an undispatched workload being dispatched to a computing device.

4. The system of claim 3, wherein the update module updates the path information by performing at least one of:
examining dispatched workload information of the plurality of dispatched workloads;
retrieving the plurality of paths that utilized the plurality of dispatched workloads;
retrieving a size of data stored under each path in the plurality of paths; and
retrieving computing device information for the plurality of computing devices that execute the plurality of dispatched workloads.

5. The system of claim 4, wherein the preferred device identification module comprises a filtering module that performs at least one of:
filtering small paths in the plurality of paths, wherein the data stored under the small paths is smaller than a size threshold;
filtering aged paths in the plurality of paths, wherein the aged paths have access times older than a time threshold; and
filtering infrequent paths in the plurality of paths, wherein the infrequent paths have access frequencies smaller than a frequency threshold.

6. The system of claim 1, wherein the preferred device identification module comprises a preferred device update module configured to update one or more preferred computing devices for a corresponding one or more undispatched workloads.

7. The system of claim 6, wherein the preferred device update module updates the one or more preferred computing devices by performing at least one of:
examining each path in the shared data storage that is utilized for each undispatched workload;
identifying stored paths in the plurality of paths, wherein a stored path is identified in the data store;
compiling a list of computing devices for identified undispatched workloads based on entries of the stored paths in the data store that match the plurality of paths in the shared data storage that are to be utilized for the undispatched workloads;
assigning a preference to the computing device identified in the list of computing devices to identify the preferred computing device; and
providing the preferred computing device for executing the particular undispatched workload.

8. The system of claim 7, wherein the preferred computing device identified in the list of computing devices is based on at least one of:
a number of paths that a prospective computing device in the plurality of computing devices has accessed and that are to be used for the particular undispatched workload;
a size of data for the paths the prospective computing device has accessed that are to be used for the particular undispatched workload; and a frequency of access for the paths that the prospective computing device has accessed that are to be used for the particular undispatched workload.

9. The system of claim 7, wherein scheduling the plurality of undispatched workloads by the schedule module comprises:
preferring to schedule the computing device identified as the preferred computing device for the execution of the particular undispatched workload; and
scheduling the preferred computing device for the particular undispatched workload based on the preference assigned to the computing device identified in the list of computing devices for execution of the particular undispatched workload.

10. A method, comprising:
scheduling workloads for execution on a plurality of computing devices, wherein the plurality of computing devices access data on a shared data storage device;
maintaining a data store that:
associates a plurality of paths in the shared data storage device with a plurality of dispatched workloads in the workloads,
associates the plurality of paths with a plurality of computing devices, wherein each computing device in the plurality of computing devices is associated with a respective path in the plurality of paths utilized by each associated computing device to retrieve the data stored on the shared data storage device for performing one or more dispatched workloads in the plurality of dispatched workloads, and
associates the data corresponding to each respective workload stored on the shared data storage device with a corresponding computing device in the plurality of computing devices based on:
the association of the plurality of paths and the plurality of dispatched workloads, and
the association of the plurality of paths and the plurality of computing devices;
identifying a preferred computing device in the plurality of computing devices for executing a particular undispatched workload in a plurality of undispatched workloads based on the association of the preferred computing device to data utilized by the preferred computing device to perform a previous dispatched workload that is the same data utilized to perform the particular undispatched workload; and
scheduling the execution of the particular undispatched workload in response to identifying the preferred computing device.

11. The method of claim 10, wherein:
the data store comprises path information that describes the plurality of paths; and
the path information for a path in the plurality of paths comprises at least one of:
a path identifier,
a size of data stored in association with the path,
one or more workload identifiers that identify the plurality of dispatched workloads that utilized the path,
the computing device that processed the plurality of dispatched workloads utilizing the path,
one or more processing times when the computing device processed the plurality of dispatched workloads utilizing the path, and
a frequency of how often the computing device processed the plurality of dispatched workloads utilizing the path.

12. The method of claim 10, further comprising updating path information in the data store in response to an undispatched workload being dispatched to a computing device.

13. The method of claim 12, wherein updating the path information comprises at least one of:
examining dispatched workload information of the plurality of dispatched workloads;
retrieving the plurality of paths that utilized the plurality of dispatched workloads;
retrieving a size of data stored under each path in the plurality of paths; and
retrieving computing device information for the plurality of computing devices that execute the plurality of dispatched workloads.

14. The method of claim 13, further comprising at least one of:
filtering small paths in the plurality of paths, wherein the data stored under the small paths is smaller than a size threshold;
filtering aged paths in the plurality of paths, wherein the aged paths have access times older than a time threshold; and
filtering infrequent paths in the plurality of paths, wherein the infrequent paths have access frequencies smaller than a frequency threshold.

15. The method of claim 10, further comprising updating one or more preferred computing devices for a corresponding one or more undispatched workloads.

16. The method of claim 15, further comprising updating the one or more preferred computing devices by performing at least one of:
examining the each path in the shared data storage that is utilized for each undispatched workload;
identifying stored paths in the plurality of paths, wherein a stored path is identified in the data store;
compiling a list of computing devices for identified undispatched workloads based on entries of the stored paths in the data store that match the plurality of paths in the shared data storage that are to be utilized for the undispatched workloads;
assigning a preference to the computing device identified in the list of computing devices to identify the preferred computing device; and
providing the preferred computing device for executing the particular undispatched workload.

17. The method of claim 16, wherein the preferred computing device identified in the list of computing devices is based on at least one of:
a number of paths that a prospective computing device in the plurality of computing devices has accessed and that are to be used for the particular undispatched workload;
a size of data for the paths the prospective computing device has accessed that are to be used for the particular undispatched workload; and
a frequency of access for the paths that the prospective computing device has accessed that are to be used for the particular undispatched workload.

18. The method of claim 16, wherein scheduling the plurality of undispatched workloads comprises:
preferring to schedule the computing device identified as the preferred computing device for the execution of the particular undispatched workload; and
scheduling the preferred computing device for the particular undispatched workload based on the preference assigned to the computing device identified in the list of computing devices for execution of the particular undispatched workload.

19. A computer program product comprising a computer-readable storage medium including program instructions embodied therewith, the program instructions executable by a processor that cause the processor to:
schedule workloads for execution on a plurality of computing devices, wherein the plurality of computing devices access data on a shared data storage device;
maintain a data store that:
associates a plurality of paths in the shared data storage device with a plurality of dispatched workloads in the workloads, wherein each dispatched workload in the plurality of dispatched workloads is associated with a respective path in the plurality of paths utilized to retrieve the data corresponding to a respective workload stored on the shared data storage device and utilized to perform the respective dispatched workload,
associates the plurality of paths with a plurality of computing devices, wherein each computing device in the plurality of computing devices is associated with a respective path in the plurality of paths utilized by each associated computing device to retrieve the data stored on the shared data storage device for performing one or more dispatched workloads in the plurality of dispatched workloads, and
associates the data corresponding to each respective workload stored on the shared data storage device with a corresponding computing device in the plurality of computing devices based on:
the association of the plurality of paths and the plurality of dispatched workloads, and
the association of the plurality of paths and the plurality of computing devices;
identify a preferred computing device in the plurality of computing devices for executing a particular undispatched workload in a plurality of undispatched workloads based on the association of the preferred computing device to data utilized by the preferred computing device to perform a previous dispatched workload that is the same data utilized to perform the particular undispatched workload; and
schedule the execution of the undispatched workload in response to identifying the preferred computing device.

20. The computer program product of claim 19, wherein:
the data store stores path information that describes the plurality of paths; and
the path information for a path in the plurality of paths comprises at least one of:
a path identifier,
a size of data stored in association with the path,
one or more workload identifiers that identify the plurality of dispatched workloads that utilized the path,
the computing device that processed the plurality of dispatched workloads utilizing the path,
one or more processing times when the computing device processed the plurality of dispatched workloads utilizing the path, and
a frequency of how often the computing device processed the plurality of dispatched workloads utilizing the path.

* * * * *